United States Patent [19]

Cosenza

[11] Patent Number: 5,061,132

[45] Date of Patent: Oct. 29, 1991

[54] SELF-LOCKING FASTENER

[75] Inventor: Frank J. Cosenza, Santa Barbara, Calif.

[73] Assignee: VSI Corporation, Carson, Calif.

[21] Appl. No.: 589,314

[22] Filed: Sep. 27, 1990

[51] Int. Cl.[5] .................. F16B 31/00; F16B 35/04
[52] U.S. Cl. .................................. 411/3; 411/278;
411/421; 411/937.2
[58] Field of Search ........................ 411/3–5,
411/277, 278, 428, 427, 937.2, 420, 421

[56] References Cited

U.S. PATENT DOCUMENTS

| 4,260,005 | 4/1981 | Stencel | 411/3 |
| 4,544,312 | 10/1985 | Stencel | 411/3 |
| 4,682,520 | 7/1987 | Gray | 411/937.2 |

FOREIGN PATENT DOCUMENTS

| 34118 | 6/1911 | Sweden | 411/278 |

Primary Examiner—Neill R. Wilson
Attorney, Agent, or Firm—Christine, Parker & Hale

[57] ABSTRACT

A self-locking fastener system comprises a pin for receipt in a hole in a workpiece and having an external thread which mates with a collar having an internal thread for carrying a tensile load. A plurality of helically extending flutes in the external thread on the pin collectively extend approximately one full revolution around the circumference of the thread. The collar has three longitudinally extending lobes for driving by a deltoid driver socket. When a desired clamp-up load is achieved on a workpiece, the socket plastically deforms the lobes and collar material radially inwardly thereof so that some of the collar material inwardly from each lobe is displaced into the void volume created by a helical flute. This displaced collar material inhibits unscrewing of the collar from the pin.

5 Claims, 2 Drawing Sheets

SELF-LOCKING FASTENER

BACKGROUND OF THE INVENTION

The present invention relates to threaded fasteners that lock when set or tightened on a workpiece and which develop a predetermined clamp-up load while being set.

Typical fasteners consist of a nut and bolt. The nut has an internal thread that screws onto the external thread of the bolt. Wrenching surfaces on the nut and bolt accept wrenches that tightly join the fasteners and one or more workpieces together. Somewhat generally speaking, another name used for a bolt is a threaded pin, and another name for a nut is a collar.

In many applications in which fasteners are used, the fasteners must have high strength and resistance to inadvertent unscrewing which would loosen a joint. Fasteners must often bear loads not only along their longitudinal axis, but transversely across the axis. More particularly, when fasteners join together two or more sheets, the sheets are often loaded in their planes with different loads. One sheet tends to slide over the other. Fasteners passing through both sheets become loaded in shear during their resistance to this type of loading.

Axial loads arise by the clamping of fastened sheets between a head of the pin on one side of the sheets and the collar on the other side of the sheets. Fasteners quite often must respond well in applications where they are cyclically stressed under conditions that could give rise to fatigue failure. A fastener with adequate clamp-up load on it tends to resist fatigue failure better than one that is not as tightly clamped against the workpiece. On the other hand, excessive clamp-up load applies a preexisting tension on the pin which, in conjunction with loads applied by the workpiece, may unduly stress the fastener.

Thus, it is desirable to know the clamping load the fastener applies to a workpiece. Clamp-up load correlates to the resistance of a collar to further threading onto a pin. As clamp-up load force increases, the resistance to further threading increases, and the torque required to turn the collar increases. This accounts for the use of torque wrenches for setting collars. Torque wrenches are, of course, cumbersome in use.

Fasteners have, therefore, been designed for providing a predetermined clamp-up load when set. One type of fastener employs a wrenching section connected to a collar by a frangible breakneck that breaks upon application of a predetermined torque that corresponds to the desired clamp-up load. Although such fasteners find substantial use, there are known disadvantages.

Another type of fastener with a predetermined clamp-up load is described in U.S. Pat. No. 4,260,005, an eponymous fastener often referred to as an Eddie bolt because of the inventor Edgar L. Stencel. In this type of fastener, there are a plurality, typically three, of longitudinally extending lobes on the outside of the collar. The Eddie bolt collar is threaded onto the pin by a driver having a deltoid shaped cavity, the sides of which engage the lobes. When the resistance to rotation of the collar increases to a predetermined level after the collar engages the surface of the workpiece being fastened, the lobes yield in radial compression and displace collar material radially inwardly of the lobe. The deformation of the lobes occurs at a selected clamp-up load on the workpiece depending on a variety of factors such as the size and shape of the lobes, fastener size, collar material and the like.

It is an obviously desirable feature of a fastener that it does not come apart in service. Various devices have been used to keep a collar and pin together. In the Eddie bolt fastener, there are a plurality of longitudinally extending flutes in a portion of the external thread on the pin. These flutes provide void volumes interrupting the thread. When the lobes yield in radial compression, collar material radially inwardly from such lobes plastically deforms and displaces inwardly into such void volumes for locking engagement with the pin, thereby inhibiting unscrewing of the collar from the pin.

The Stencel patent illustrates a self-locking fastener with three longitudinally extending lobes on the outside of the collar, and six longitudinally extending flutes in the external thread on the pin. It was later realized that it was desirable to avoid a number of flutes which is an integral multiple of the number of lobes on a collar. In such an arrangement, there are occasional positions of the collar on the pin where the lobes are not radially aligned with a flute, and secure locking may not be obtained.

For such reasons, commercial Eddie bolts now typically have five flutes approximately 72° apart around the circumference of the thread, and the corresponding collars have three lobes. Even in such an embodiment, there remains a small but finite set of rotational positions where there is poor alignment between the lobes and flutes. Thus, the resistance to unscrewing of the collar from the pin may vary from fastener to fastener. It is desirable to provide a fastener with a greater uniformity of resistance to unscrewing.

BRIEF SUMMARY OF THE INVENTION

There is, therefore, provided in practice of this invention according to a presently preferred embodiment, a self-locking fastener including a pin for receipt in a hole in a workpiece and having a section with an external thread. A plurality of flutes are provided in a portion of the externally threaded section truncating at least the crest of the thread, with each of the flutes extending in a helical path around the thread. The flutes collectively have a sufficient length to extend approximately one revolution around the circumference of the thread.

Such a self-locking fastener has a plurality of void volumes interrupting a portion of the length of the external thread. When used with a collar having an internal thread for mating with the external thread, and which has a plurality of longitudinally extending lobes on the outside of the collar, the lobes and void volumes are arranged so that, in any rotational position of the collar on the pin, each lobe is radially aligned with a void volume.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
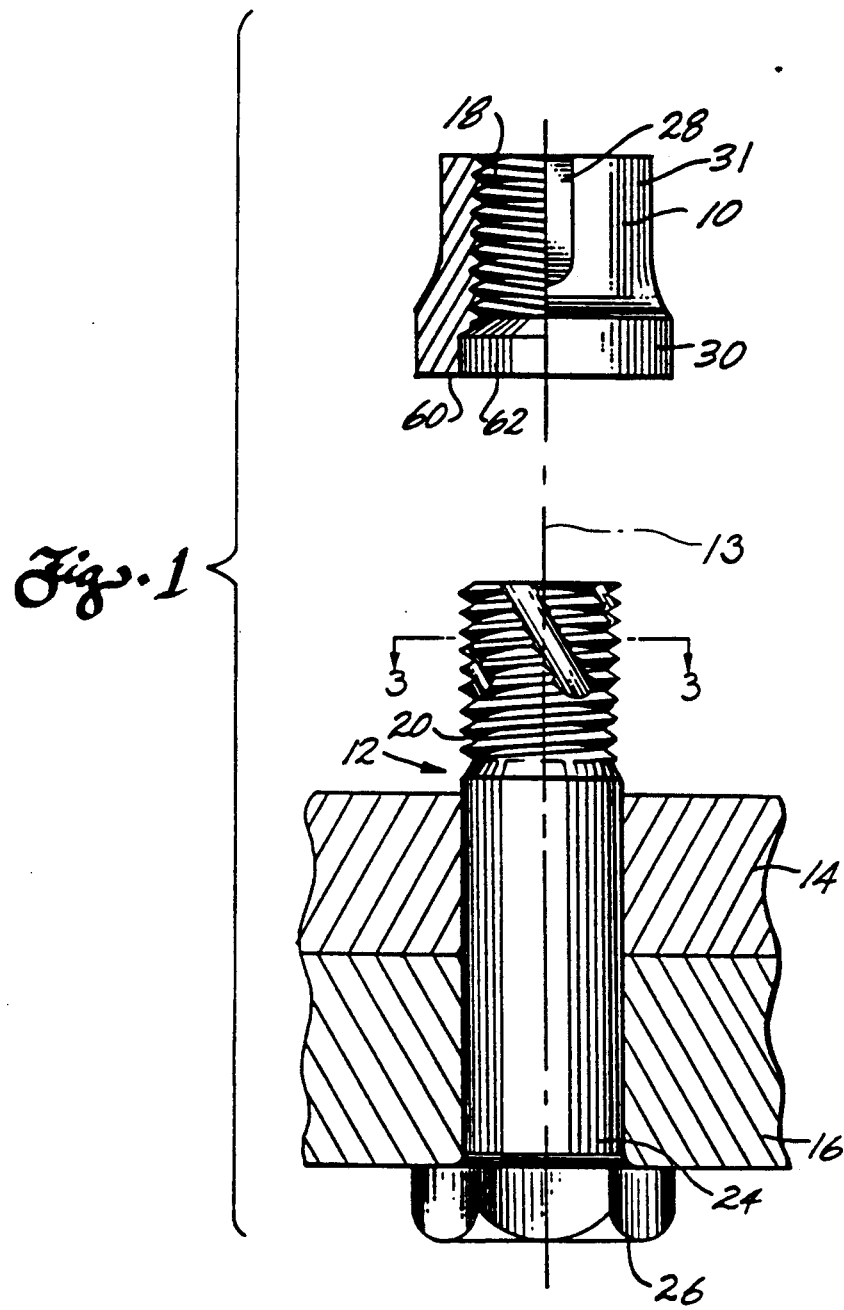
FIG. 1 is an exploded elevational view of a collar and pin of the present invention with the collar being shown partly in cross-section and the pin being shown in a pair of sheets.

FIG. 1 shows a locking collar and a shear pin 12 which together form a fastening system. The collar and pin have a common axis 13. A pair of sheets 14 and 16 are connected together by the pin. The collar has an internally threaded circular bore 18. The pin has a male thread 20 at one end which receives the thread of the locking collar. As described L in greater detail hereinafter, the external thread on the pin is interrupted by a plurality of helically extending flutes 22.

The pin has an unthreaded 24 received in aligned holes in the workpiece which in the illustrated embodiment is in the form of sheets 14 and 16. A head 26 on the pin bears on an exposed surface of one of the sheets to develop an axial clamp-up load on the sheets in cooperation with the locking collar. The head of the pin is arbitrarily illustrated as hexagonal for wrenching. Any of a variety of heads may be used, including countersunk heads and heads without a wrenching surface. In such an embodiment a wrenching recess (not shown) may be provided in the threaded end of the pin.

The flutes extend an axial distance along the pin less than the full length of the thread. Thus, the thread is not fully developed or is interrupted at the flutes. The balance of the thread between the end of the flutes and the shank 24 is fully developed for greater axial load supporting capability.

The locking collar has a plurality of external axially extending ribs or lobes 28 regularly spaced apart around the circumference of the collar. With three lobes on the collar, they are spaced 120° apart. In radial planes with respect to the axis of the collar, the lobes have convex outward circular curvature, with the curvature on all of the lobes being equal. An axial wall 31 on the collar between the lobes is right cylindrically curved with a center of curvature on the axis 13. A base or foot 30 on the collar has a diameter larger than the balance of the collar to reduce unit load on the sheets. A clearance counterbore 62 is provided in the base 60 in a conventional manner.

The setting of such a collar on a pin with axially extending flutes is described in Stencel Patent No. 4,260,005, the subject matter of which is hereby incorporated by reference. Generally speaking, as the collar is engaged by a driver with a deltoid socket, the walls of the deltoid socket bear against the lobes and screw the collar onto the pin. The driver does not deform the lobes at this time because the resistance to rotation during assembly is slight.

With continued rotation as the collar engages the sheet 14 (or an intervening washer, if used) the sheets are pulled together with increasing clamp-up load and resistance to rotation of the collar increases. The engagement of the deltoid driver socket on the lobes produces both radial and tangential components of force on the lobes. The radial component of force begins to flatten the lobes into the body of the collar. The material thus displaced pushes material on the inside of the collar into void spaces defined by the flutes in the external thread on the pin.

After the driver completely erases the lobes by plastic deformation, it is free to turn on the collar and the operator knows that a joint has been effected. The lobes and driver are dimensioned so that upon elimination of the lobes, the collar and pin apply a predetermined clamp-up load on the workpiece.

At least a portion of the collar material displaced radially inwardly by plastic deformation of the lobes moves into the void volumes provided by the helically extending flutes. This displaced material from the collar engages the remaining portion of the thread in the fluted portion of the pin and inhibits unscrewing of the collar from the pin. Assembly of the collar on the pin, clamp-up up to a desired preload on the workpiece, and self-locking of the fastener are all effected by a single tool.

Figure 2:
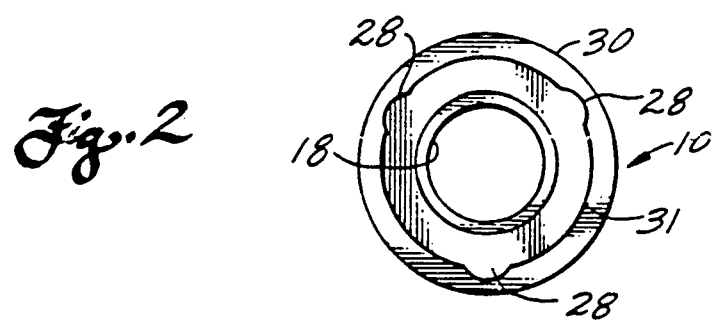
FIG. 2 is a top plan view of the collar of FIG. 1.
Figure 3:
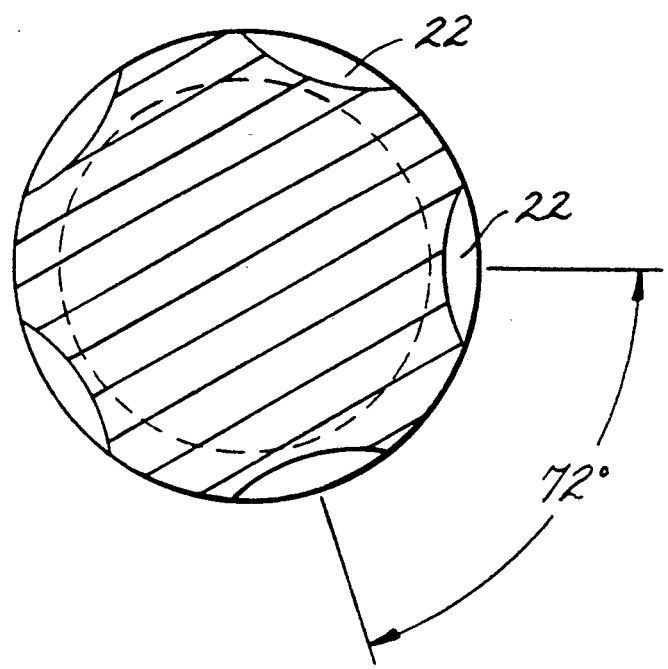
FIG. 3 is a transverse cross-section through a portion of the thread on the pin of FIG. 3.

In the embodiment of self-locking fastener illustrated in FIGS. 1 to 3, there are five helically extending flutes interrupting at least the crest of the thread for providing void volumes into which material radially inwardly from the lobes can be displaced when the collar is set on the pin. The five flutes are evenly spaced 72° apart around the circumference of the thread. Furthermore, each flute extends around the pin approximately 1/5 of a revolution. Thus, in a circumferential direction, there is little if any gap between the tip end 34 of one flute and the shank end 36 of the next adjacent flute.

In effect, the helically extending flutes are like five collar-locking threads superimposed on the load supporting external thread of the pin. The collar locking threads or flutes have a pitch length several times the pitch of the load supporting thread. Each of the collar locking threads extends less than one full revolution along the length of the pin.

Preferably the flutes extend in a helical direction opposite to the direction of the load supporting thread. That is, when the load supporting thread is a conventional right-hand thread, it is preferred that the collar locking thread be left handed. This places the flutes more nearly perpendicular to the load supporting thread and is believed to provide an enhanced resistance to unscrewing.

It will be seen in this embodiment that collectively the flutes extend approximately one full revolution around the circumference of the external thread. Thus, regardless of the rotational position of the collar on the pin, each lobe on the collar is radially aligned with a portion of the void volume formed by the helically extending flutes. Thus, all of the lobes contribute to locking of the collar on the pin. Furthermore, the amount of collar material displaced radially inwardly into the flutes is substantially the same regardless of the rotational position of the collar on the pin. This tends to enhance uniformity of the resistance to unscrewing. There is no position where none of the lobes line up with a flute.

The flutes are formed in the tip of the pin either before or after the thread is rolled. One may, for example, employ a pin blank having a tip with helically extending "flats" or grooves corresponding to the flutes to be formed. When a thread is rolled on such a blank, the thread is incompletely formed opposite the grooves. Alternatively, a thread may be rolled on a conventional cylindrical blank and the flutes thereafter ground into the thread. With either technique the flutes in transverse cross-section of the pin may appear concave as illustrated in FIG. 3 or as flats or even be slightly convex. A somewhat concave flute apparently provides the greatest resistance to unscrewing.

Figure 4:
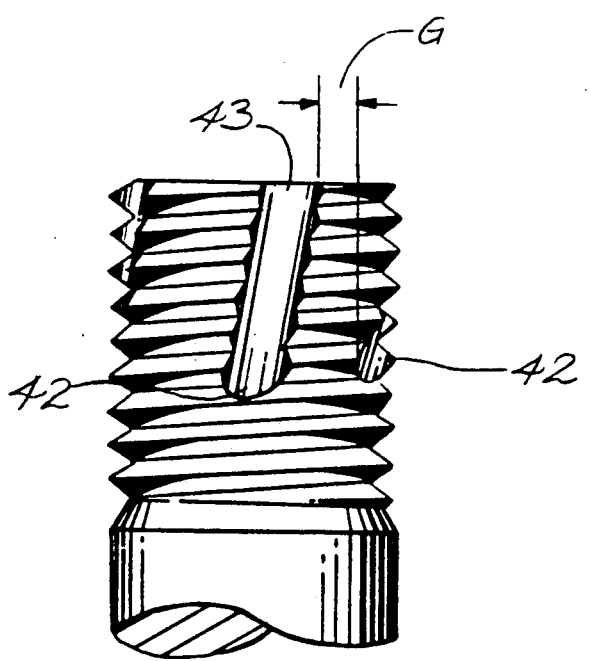
FIG. 4 is a fragmentary elevational view of the thread on another embodiment of pin constructed according to principles of this invention.
Figure 5:
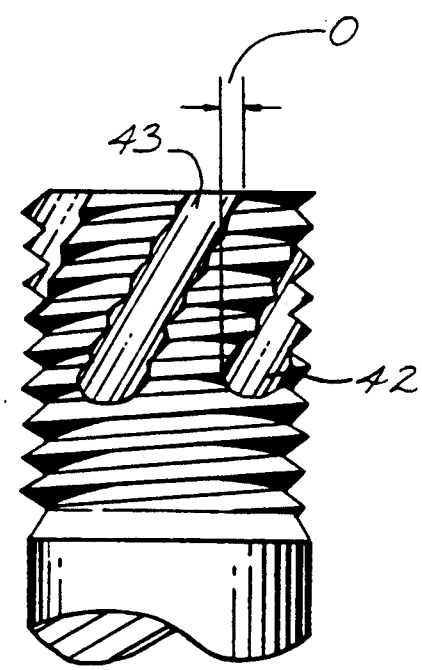
FIG. 5 is a view similar to FIG. 4 of another embodiment of pin.

FIGS. 4 and 5 illustrate additional embodiments of threaded pin with helically extending flutes. In these embodiments the flutes are illustrated extending helically in the same direction as the direction of the helical load supporting thread, but they may just as well extend in the opposite direction. In the embodiment illustrated in FIG. 4, the pitch of the collar locking flutes is longer than in the embodiment illustrated in FIG. 1 so that there is a small circumferential "gap" G between the shank end 42 of the flute and the tip end 43 of an adjacent flute. Such an embodiment where the flutes collectively extend less than one full revolution around the circumference of the thread may still assure that collar material inwardly from each of the lobes engages a flute since the lobes have some circumferential width around the collar.

On the other hand it may be desirable to provide an overlap O between the shank end 42 of one flute and the tip end 43 of an adjacent flute, as illustrated in the embodiment FIG. 5. By carefully choosing the amount of overlap, the pressure on thread rolling dies may be kept uniform throughout the rolling of the fastener, thereby enhancing uniformity of thread form when the thread is rolled on a blank having preformed grooves.

Although to provide some resistance to unscrewing of a collar from a pin it is only necessary to truncate the crest of the thread with shallow flutes, it is preferable to extend the flutes to the thread root. The deeper the flute extends into the thread the greater the amount of material deformed into the flutes and the greater the resistance to unscrewing. It is preferable to avoid extending the flutes much beyond the thread root since this reduces the tensile load carrying capability of the assembled fastener. It may be noted that the Eddie bolt type fastener is used primarily in shear loading situations such as where sheets are joined or connected to underlying structure, rather than in applications where the principal loading on the fastener is axial.

Although only a few embodiments of self-locking fastener constructed according to principles of this invention have been described and illustrated herein, many modifications and variations will be apparent to those skilled in the art. Thus, for example, in the illustrated embodiment the collar has three lobes and the pin has five flutes. Different numbers of flutes and lobes may be used.

Furthermore, since the helical arrangement of void volumes assures that some collar material radially inward from each lobe will be displaced into a flute, it is no longer necessary to avoid having the number of flutes being an integral multiple of the number of lobes. Thus, a fastener where the pin has six helically extending flutes may be used with a collar having three longitudinally extending lobes.

Since other modifications and variations may be practiced by those skilled in the art, it will be understood that the scope of this invention is limited only by the following claims.

What is claimed is:

1. A self-locking fastener comprising:
    a pin for receipt in a hole in a workpiece and having a section with an external thread;
    a plurality of flutes extending in a helical direction in a portion of the length of the external thread truncating at least the crest of the thread, a portion of the length of the thread being complete;
    a collar having an internal thread for mating with the external thread and carrying a tensile load; and
    a plurality of longitudinally extending lobes on the outside of the collar for engagement by a driver, each lobe and collar material radially inward of said lobe being plastically deformable in response to a radial compressive force applied by the driver when the collar is in engagement with a workpiece such that upon plastic deformation of the lobe and material radially inward thereof in a radial direction, collar material enters such a flute for rotationally locking the pin and collar together; and wherein
    the lobes and flutes are arranged so that in any rotational position of the collar on the pin when the collar is in engagement with a workpiece, at least some material radially inward from each lobe will enter a flute.

2. A self-locking fastener as recited in claim 1 wherein the flutes collectively extend approximately one full revolution around the circumference of the external thread.

3. A self-locking fastener as recited in claim 2 comprising five flutes, each flute extending approximately 1/5 of a revolution around the circumference of the thread.

4. A self-locking fastener as recited in claim 2 comprising five flutes, each flute extending approximately 1/5 of a revolution around the circumference of the thread.

5. A self-locking fastener comprising:
    a pin for receipt in a hole in a workpiece and having a section with an external thread;
    a plurality of helically extending flutes interrupting a portion of the length of the external thread, the flutes collectively extending approximately one full revolution around the circumference of the external thread, a portion of the thread being uninterrupted;
    a collar having an internal thread for mating with the external thread and carrying a tensile load; and
    a plurality of longitudinally extending lobes on the outside of the collar for engagement by a driver; and wherein
    the lobes and flutes are arranged so that in any rotational position of the collar on the pin each lobe is radially aligned with a portion of a flute.

* * * * *

UNITED STATES PATENT AND TRADEMARK OFFICE
CERTIFICATE OF CORRECTION

PATENT NO. : 5,061,132
DATED : October 29, 1991
INVENTOR(S) : Frank J. Cosenza

It is certified that error appears in the above-identified patent and that said Letters Patent is hereby corrected as shown below:

```
Column 3, line  8, after "collar" insert -- 10 --.
Column 3, line 14, after "described" delete "L".
Column 3, line 17, after "unthreaded" insert-- shank --.
Column 3, line 31, change "end" to -- ends --.
Column 3, line 44, change "load" to -- loading --.

Column 6, line 37, claim 4, line 1, change "2" to -- 1 --.
```

Signed and Sealed this

Fifteenth Day of June, 1993

Attest:

MICHAEL K. KIRK

*Attesting Officer*     Acting Commissioner of Patents and Trademarks